US005561091A

United States Patent [19]

Mink et al.

[11] Patent Number: 5,561,091
[45] Date of Patent: Oct. 1, 1996

[54] HIGH ACTIVITY POLYETHYLENE CATALYST PREPARED FROM AN ALCOHOL AND SILICON TETRACHLORIDE

[75] Inventors: Robert I. Mink, Warren; Thomas E. Nowlin, West Windsor, both of N.J.

[73] Assignee: Mobil Oil Corporation, Fairfax, Va.

[21] Appl. No.: 432,879

[22] Filed: May 2, 1995

Related U.S. Application Data

[63] Continuation of Ser. No. 153,850, Nov. 18, 1993, abandoned.

[51] Int. Cl.$^6$ .................................................. C08F 4/656
[52] U.S. Cl. .......................... 502/115; 502/119; 502/120; 502/125; 526/124.3; 526/124.5; 526/124.6; 526/124.9; 526/127; 526/129
[58] Field of Search ........................... 502/115, 119, 502/120, 125; 526/124.3, 124.5, 124.6, 129, 127, 124.9

[56] References Cited

U.S. PATENT DOCUMENTS

| | | | |
|---|---|---|---|
| 2,905,645 | 9/1959 | Anderson et al. | 252/129 |
| 3,574,138 | 4/1971 | Ziegler | 252/429 |
| 3,787,384 | 1/1974 | Stevens et al. | 260/94.9 |
| 4,063,009 | 12/1977 | Ziegler et al. | 526/159 |
| 4,076,698 | 2/1978 | Anderson et al. | 526/348.6 |
| 4,113,654 | 9/1978 | Mayr et al. | 252/429 C |
| 4,148,754 | 4/1979 | Strobel et al. | 252/429 |
| 4,173,547 | 11/1979 | Graff | 252/429 |
| 4,212,961 | 7/1980 | Kobayashi et al. | 526/151 |
| 4,263,171 | 4/1981 | Shida et al. | 252/429 C |
| 4,296,223 | 10/1981 | Berger | 526/125 |
| 4,301,029 | 11/1981 | Caunt et al. | 252/429 B |
| 4,302,566 | 11/1981 | Karol et al. | 526/125 |
| 4,335,016 | 6/1982 | Dombro | 252/429 B |
| 4,374,753 | 2/1983 | Pullukat et al. | 252/429 B |
| 4,378,304 | 3/1983 | Dombro | 252/429 B |
| 4,381,252 | 4/1983 | Sakurai et al. | 252/429 B |
| 4,383,939 | 5/1983 | Johnstone | 252/429 B |
| 4,385,161 | 5/1983 | Caunt et al. | 526/114 |
| 4,396,533 | 8/1983 | Johnstone | 252/429 B |
| 4,397,762 | 8/1983 | Johnstone | 252/429 B |
| 4,402,861 | 9/1983 | Hoff | 252/429 B |
| 4,434,083 | 2/1984 | van de Leemput et al. | 502/154 |
| 4,458,058 | 7/1984 | Dombro | 526/129 |
| 4,478,988 | 10/1984 | Pullukat et al. | 526/128 |
| 4,481,301 | 11/1984 | Nowlin et al. | 502/104 |
| 4,497,906 | 2/1985 | Hanji et al. | 502/110 |
| 4,524,141 | 6/1985 | Pullukat et al. | 502/107 |
| 4,525,469 | 6/1985 | Ueda et al. | 502/115 |
| 4,525,557 | 6/1985 | Heilman et al. | 526/128 |
| 4,530,912 | 7/1985 | Pullukat et al. | 502/104 |
| 4,530,913 | 7/1985 | Pullukat et al. | 502/104 |
| 4,540,753 | 9/1985 | Cozewith et al. | 526/88 |
| 4,558,023 | 12/1985 | Brun et al. | 502/108 |
| 4,558,024 | 12/1985 | Best | 502/115 |
| 4,558,025 | 12/1985 | Best | 502/115 |
| 4,565,795 | 1/1986 | Short et al. | 502/110 |
| 4,565,796 | 1/1986 | Etherton | 502/112 |
| 4,567,243 | 1/1986 | Pullukat et al. | 526/128 |
| 4,578,440 | 3/1986 | Pullukat et al. | 526/128 |
| 4,579,835 | 4/1986 | Best | 502/120 |
| 4,611,038 | 9/1986 | Brun et al. | 526/169.2 |
| 4,656,151 | 4/1987 | Shelly et al. | 503/113 |
| 4,665,141 | 5/1987 | Aylward | 526/86 |
| 4,672,050 | 6/1987 | Sasaki et al. | 502/116 |
| 4,672,096 | 6/1987 | Nowlin | 526/116 |
| 4,678,767 | 7/1987 | Tachikawa et al. | 502/104 |
| 4,690,991 | 9/1987 | Seppala | 526/158 |
| 4,704,376 | 11/1987 | Blenkers et al. | 502/104 |
| 4,711,865 | 12/1987 | Speca | 502/116 |
| 4,716,207 | 12/1987 | Cozewith et al. | 526/169.2 |
| 4,727,049 | 2/1988 | Furuhashi et al. | 502/115 |
| 4,732,882 | 3/1988 | Allen et al. | 502/104 |
| 4,748,221 | 5/1988 | Collomb et al. | 526/153 |
| 4,754,007 | 6/1988 | Pullukat et al. | 526/130 |
| 4,771,023 | 9/1988 | Sasaki et al. | 603/116 |
| 4,786,697 | 11/1988 | Cozewith et al. | 526/88 |
| 4,804,794 | 2/1989 | Ver Strate et al. | 585/12 |
| 4,829,038 | 5/1989 | Hoppin et al. | 502/125 |
| 4,833,111 | 5/1989 | Nowlin | 502/107 |
| 4,849,389 | 7/1989 | Nowlin et al. | 502/107 |
| 4,849,390 | 7/1989 | Sano et al. | 502/113 |
| 4,876,321 | 10/1989 | Lo et al. | 526/129 |
| 4,888,318 | 12/1989 | Allen et al. | 502/105 |
| 4,916,099 | 4/1990 | Sasaki et al. | 502/126 |
| 4,923,935 | 5/1990 | Sano et al. | 526/73 |
| 4,940,682 | 7/1990 | Sasaki et al. | 502/113 |
| 5,006,619 | 4/1991 | Pullukat et al. | 526/128 |
| 5,021,382 | 6/1991 | Maplass, Jr. | 502/117 |
| 5,023,223 | 6/1991 | Ebara et al. | 502/116 |
| 5,028,671 | 7/1991 | Kioka et al. | 526/125 |
| 5,034,365 | 7/1991 | Buehler et al. | 502/119 |
| 5,063,188 | 11/1991 | Malpass et al. | 502/116 |
| 5,064,799 | 11/1991 | Monte et al. | 502/115 |
| 5,077,255 | 12/1991 | Welborn, Jr. | 502/104 |
| 5,106,926 | 4/1992 | Eisinger et al. | 526/88 |
| 5,112,785 | 5/1992 | Brun et al. | 502/108 |

(List continued on next page.)

FOREIGN PATENT DOCUMENTS

| | | |
|---|---|---|
| 0261808 | 3/1988 | European Pat. Off. . |
| 0306939 | 3/1989 | European Pat. Off. . |
| 0435557A2 | 7/1991 | European Pat. Off. . |
| WO93/09147 | 5/1993 | WIPO . |

OTHER PUBLICATIONS

Zambelli, Adolfo et al., "Isotactic Polymerization of Propene: Stereoregularity of the Insertion of the First Monomer Unit as a Fingerprint of the Catalytic Active Site", Macromolecules, vol. 15, No. 3, 831–834, (1982).

Primary Examiner—Romulo H. Delmendo
Attorney, Agent, or Firm—Ronald A. Bleeker; Dennis P. Santini; Marina V. Schneller

[57] ABSTRACT

A catalyst composition for producing linear low density polyethylene with relatively narrower molecular weight distributions is described. The catalyst is formed by treating silica having reactive OH groups with a dialkylmagnesium in a solvent for said dialkylmagnesium; then adding to said magnesium-containing support a mixture of ROH and $SiCl_4$ to form an intermediate which is subsequently treated with a transition metal to form a transition metal-containing intermediate, the catalyst precursor. The catalyst precursor is activated with a trialkylaluminum compound.

38 Claims, No Drawings

U.S. PATENT DOCUMENTS

| | | | |
|---|---|---|---|
| 5,117,043 | 5/1992 | Koyama et al. | 502/125 |
| 5,130,283 | 7/1992 | Murata et al. | 502/116 |
| 5,143,883 | 9/1992 | Buehler et al. | 502/119 |
| 5,145,821 | 9/1992 | Buehler et al. | 502/119 |
| 5,147,839 | 9/1992 | Fujita et al. | 502/119 |
| 5,153,158 | 10/1992 | Kioka et al. | 502/126 |
| 5,191,042 | 3/1993 | Cozewith | 526/144 |
| 5,194,531 | 3/1993 | Toda et al. | 526/125 |
| 5,221,650 | 6/1993 | Buehler | 502/104 |
| 5,227,355 | 7/1993 | Seppala et al. | 502/125 |
| 5,231,151 | 7/1993 | Spencer et al. | 526/116 |
| 5,232,998 | 8/1993 | Buehler et al. | 526/125 |
| 5,244,853 | 9/1993 | Wang et al. | 502/116 |
| 5,258,342 | 11/1993 | Luciani et al. | 502/107 |
| 5,275,991 | 1/1994 | Buehler et al. | 502/107 |
| 5,336,652 | 8/1994 | Mink et al. | 502/125 | under HIGH ACTIVITY POLYETHYLENE CATALYST PREPARED FROM AN ALCOHOL AND SILICON TETRACHLORIDE This is a continuation of application Ser. No. 08/153,850, filed Nov. 18, 1993, now abandoned.

FIELD OF THE INVENTION

The present invention relates to a method for copolymerizing ethylene and alpha-olefins, a catalyst composition for such a polymerization and a method for producing such a catalyst composition. A particular aspect of the present invention relates to a method for producing linear low density copolymers of ethylene, hereinafter referred to as "LLDPE".

LLDPE resins possess properties which distinguish them from other polyethylene polymers such as homopolymers of polyethylene. Certain of these properties are described in the Anderson et al U.S. Pat. No. 4,076,698.

BACKGROUND OF THE INVENTION

When the LLDPE resins are fabricated into injection-molded products, it is imperative to assure that such products are not susceptible to warping or shrinking. As is known to those skilled in the art, the degree of warping or shrinking can be predicted from the molecular weight distribution of the resins. Resins having a relatively narrow molecular weight distribution produce injection-molded products exhibiting a minimum amount of warping or shrinkage. Conversely, resins having a relatively broad molecular weight distribution produce injection-molded products more likely to undergo warping or shrinkage.

One of the measures of the molecular weight distribution of the resin is melt flow ratio (MFR), which is the ratio of high load melt index (HLMI or $I_{21}$) to melt index ($I_2$) for a given resin. The MFR value is believed to be an indication of the molecular weight distribution of the polymer, the higher the value, the broader the molecular weight distribution. Resins having relatively low MFR values, e.g., of about 20 to about 45, have relatively narrow molecular weight distributions. Additionally, LLDPE resins having such relatively low MFR values produce films of better strength properties than resins with high MFR values.

The molecular weight of the ethylene copolymers may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced,.

Another important property of catalyst composition for ethylene/alpha-olefin copolymerization catalysts is the ability thereof to effectively copolymerize ethylene with higher alpha-olefins, e.g., $C_3$–$C_{10}$ alpha-olefins, to produce resins having low densities. This property of the catalyst composition is referred to as "higher alpha-olefin incorporation property" and is usually measured by determining the amount of a higher alpha-olefin (e.g., 1-butene, 1-hexene or 1-octene) required in the polymerization process, e.g. fluid-bed reactor process, to produce a copolymer of ethylene and the higher alpha-olefin having a given density. The lesser is the amount of the higher alpha-olefin required to produce a resin of a given density, the higher are the production rates and, therefore, the lower is the cost of producing such a copolymer. A high value of an alpha-olefin incorporation factor is especially important in the gas-phase fluid bed process, because relatively high concentrations of higher alpha-olefins in the fluid-bed reactor may cause poor fluidization caused, e.g., by resin stickiness. Therefore, production rates must be significantly reduced to avoid such problems. Consequently, catalyst compositions with relatively high alpha-olefin incorporation factor values avoid these problems and are more desirable.

Accordingly, it is important to provide a catalyst composition capable of producing ethylene copolymers having a relatively narrow molecular weight distribution (low MFR values) and low densities.

It is therefore a primary object of the present invention to provide a high activity catalyst for the polymerization of alpha-olefins yielding products of a relatively narrow molecular weight distribution.

It is an additional object of the present invention to provide a catalytic process for copolymerizing ethylene and alpha-olefins which yields LLDPE resins of a relatively narrow molecular weight distribution at high productivity.

SUMMARY OF THE INVENTION

A supported catalyst composition of this invention is prepared in a multi-step process. In the first step, a mixture of a solid, porous carrier and a non-polar liquid, specifically a solvent, is contacted with at least one organomagnesium compound to form a slurry; the organomagnesium compound has the formula

where R and R' are tire same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n=2.

Subsequently, the mixture of the first step is contacted with a mixture of an alcohol and $SiCl_4$ in a non-polar solvent. The resulting mixture is then contacted with at least one transition metal compound soluble in a non-polar solvent. The resulting catalyst precursor is subsequently contacted, for activation and activated catalyst production, with a trialkylaluminum compound.

The resulting activated catalyst composition has substantially higher activity and thus exhibits relatively high productivity in the copolymerization of ethylene and alpha-olefins.

The catalyst composition also produces polymers having a narrow molecular weight distribution. The molecular weight distribution is narrower than that of polymers produced with catalytic compositions free of the $SiCl_4$ compound; moreover, the molecular weight distribution is narrower than that of polymers produced with catalytic compositions containing the $SiCl_4$ compound but not the alcohol component required by the invention.

DETAILED DESCRIPTION

In accordance with the present invention, a supported titanium compound is incorporated onto a suitable support by impregnating this support first with a reactive magnesium compound and utilizing this supported magnesium compound to react with a tetravalent titanium compound in a liquid medium. The unreacted titanium compound remains soluble in this liquid medium, while the reacted titanium species and the supported magnesium species are insoluble in this liquid medium.

As used herein, the concept of supporting a material on a carrier is intended to connote the incorporation of material (e.g., magnesium compounds and/or titantium compounds) onto the carrier by physical or chemical means. Accordingly, supported material need not necessarily be chemically bound to the carrier.

Suitable carrier materials which may be treated include solid, porous carrier materials such as silica, alumina and combinations thereof. Such carrier materials may be amorphous or crystalline in form. These carriers may be in the form of particles having a particle size of from about 0.1 micron to about 250 microns, preferably from 10 to about 200 microns, and most preferably from about 10 to about 80 microns. Preferably, the carrier is in the form of spherical particles, e.g., spray dried silica.

The carrier material is also porous. The internal porosity of these carriers may be larger than 0.2 cm$^3$/g,. The specific surface area of these carriers is at least 3 m$^2$/g, preferably at least about 50 m$^2$/g, and more preferably from, e.g., about 150 to about 1500 m$^2$/g.

It is desirable to remove physically bound water from the carrier material prior to contacting this material with water-reactive magnesium compounds. This water removal may be accomplished by heating the carrier material to a temperature from about 100° C. to an upper limit of temperature represented by the temperature at which sintering occurs. A suitable range of temperatures may, thus, be from about 100° C. to about 800° C., e.g., from about 150° C. to about 650° C.

Silanol groups (Si—OH) may be present when the carrier is contacted with water-reactive magnesium compounds in accordance with the present invention. These Si—OH groups may be present at from about 0.5 to about 3 mmol of OH groups per gram of carrier, but a preferred range is from about 0.4 to about 1.5 mmol of OH groups per gram of carrier. Excess OH groups present in the carrier may be removed by heating the carrier for a sufficient time at a sufficient temperature to accomplish the desired removal. More particularly, for example, a relatively small number of OH groups may be removed by sufficient heating at from about 150° C. to about 250° C., whereas a relatively large number of OH groups may be removed by sufficient heating at least 500 or 800° C., most especially, from about 550° C. to about 650° C. The duration of heating may be from 4 to 16 hours. In a most preferred embodiment, the carrier is silica which, prior to the use thereof in the first catalyst synthesis step, has been dehydrated by fluidizing it with nitrogen or air and heating at least about 600° C. for about 16 hours to achieve a surface hydroxyl group concentration of about 0.7 millimoles per gram.. The surface hydroxyl concentration of silica may be determined according to J. B. Peri and A. L. Hensley, Jr., *J. Phys. Chem.*, 32 (8), 2926 (1968). The silica of the most preferred embodiment is a high surface area, amorphous silica (surface area=300 m$^2$/g; pore volume of 1.65 cm$^3$/g), and it is a material marketed under the tradenames of Davison 952 or Davison 955 by the Davison Chemical Division of W. R. Grace and Company. When silica which has been dehydrated by fluidizing with nitrogen or air and heating at about 600° C. for about 16 hours, the surface hydroxyl concentration is about 0.72 mmols/g.

While heating is a preferred means of removing OH groups inherently present in a carrier such as silica, other removal means are also possible such as chemical means. For example, a desired proportion of OH groups may be reacted with a chemical agent such as a hydroxyl reactive aluminum compound, e.g., triethylaluminum.

Other examples of suitable carrier materials are described in the Graff, U.S. Pat. No. 4,173,547. Note particularly the passage extending from column 3, line 62 to column 5, line 44 of this Graff patent. It is noted that internal porosity of carriers can be determined by a technique termed BET-technique, described by S. Brunauer, P. Emmett and E. Teller in *Journal of the American Chemical Society*, 60, pp. 209–319 (1938). Specific surface areas of carriers can also be measured in accordance with the above-mentioned BET-technique, with use of the standardized method as described in *British Standards* BS 4359, Volume 1, (1969).

The carrier material is slurried in a non-polar solvent and the resulting slurry is contacted with at least one organomagnesium compound. The slurry of the carrier material in the solvent is prepared by introducing the carrier into the solvent, preferably while stirring, and heating the mixture to about 25° to about 100° C., preferably to about 35° C. to about 75° C. The slurry is then contacted with the aforementioned organomagnesium compound, while the heating is continued at the aforementioned temperature.

The organomagnesium compound has the empirical formula

where R and R' are the same or different C$_2$–C$_{12}$ alkyl groups, preferably C$_4$–C$_{10}$ alkyl groups, more preferably C$_4$C$_8$ alkyl groups, and most preferably both R and R' are butyl groups, and m and n are each 0, 1 or 2, providing that m+n=2.

Suitable non-polar solvents are materials which are liquid at reaction temperatures and in which all of the reactants used herein, e.g., the organomagnesium compound, the transition metal compound, SiCl$_4$, and the alcohol are at least partially soluble. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed. The most preferred non-polar solvents are isopentane, hexane, and heptane. Prior to use, the non-polar solvent should be purified, such as by percolation through silica gel and/or molecular sieves, to remove traces of water, oxygen, polar compounds, and other materials capable of adversely affecting catalyst activity.

In the most preferred embodiment of the synthesis of this catalyst it is important to add only such an amount of the organomagnesium compound that will be deposited—physically or chemically—onto the support since any excess of the organomagnesium compound in the solution may react with other synthesis chemicals and precipitate outside of the support. The carrier drying temperature affects the number of sites on the carrier available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the support without leaving any excess of the organomagnesium compound in the solution. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with the reagents added subsequently, thereby forming a precipitate outside of the support which is detrimental in the synthesis of our catalyst and must be avoided.

For example, for the silica carrier heated at about 600° C., the amount of the organomagnesium compound added to the slurry is such that the molar ratio of Mg to the hydroxyl groups (OH) in the solid carrier is about 1:1 to about 4:1, preferably about 1.1:1 to about 2.8:1, more preferably about 1.2:1 to about 1.8:1 and most preferably about 1.4:1.

The amount of magnesium compound which is impregnated onto the carrier should be sufficient to react with the reaction product of adding $SiCl_4$ to an alcohol and then the tetravalent titanium compound in order to incorporate a catalytically effective amount of titanium on the carrier in the manner set forth herein below. When a liquid containing an organomagnesium compound is contacted with a carrier the amount of magnesium in this liquid in terms of mmol may be essentially the same as that stated above with respect to that which is impregnated onto the carrier.

An essential component in the production of the catalyst composition of the invention is $SiCl_4$. The compound is added in an amount effective to narrow the molecular weight distribution of the copolymer or in amounts effective to increase the catalyst activity. Generally the amount of this compound is such that the molar ratio of $SiCl_4$ to Mg ranges from 0.40 to 1.40.

The slurry of the carrier material containing the organomagnesium species in the solvent is maintained at temperatures of about 35 to about 75° C., for introduction of $SiCl_4$. The $SiCl_4$ compound is introduced after organomagnesium incorporation and preferably before transition metal incorporation into the catalyst. The amount of the $SiCl_4$ compound added is such that the molar ratio of $SiCl_4$ to Mg on the solid carrier is about 0.40 to about 1.40.

In a preferred embodiment the carrier supported magnesium metal intermediate is treated with an alcohol ROH where R is an alkyl group of 1 to 10 carbon atoms, such as methyl, ethyl, propyl, iso-propyl, butyl, iso-butyl, t-butyl, pentyl, iso-pentyl, 2,2-dimethyl-propyl, octyl, nonyl, decyl, etc. In the most preferred embodiment, the alcohol treatment is undertaken simultaneously with the $SiCl_4$ addition. Accordingly, in the most preferred embodiment, a mixture of the alcohol, $SiCl_4$ and an non-polar solvent are formed and then added to the supported magnesium metal containing intermediate. The molar ratio of alcohol to $SiCl_4$ ranges from 0.50 to 6.00.

The slurry is then contacted with at least one transition metal compound soluble in a non-polar solvent. This synthesis step is conducted at about 25 to about 75° C., preferably at about 30° to about 65° C., and most preferably at about 45° to about 60° C. In a preferred embodiment, the amount of the transition metal compound added is not greater than that which can be deposited onto the carrier. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1 to about 2.0, preferably about 1.3 to about 2.0. The amount of the transition metal compound is also such that the molar ratio of Mg to the transition metal is about 0.5 to about 3, preferably about 1 to about 2. These molar ratios produce catalyst compositions which produce resins having relatively low MFR values of about 20 to about 45. As is known to those skilled in the art, such resins can be utilized to produce high strength films or injection molding products which are resistant to warping and shrinking.

Suitable transition metal compounds used herein are compounds of metals of Groups 4, 5, or 6 as adopted by the new IUPAC notation, providing that such compounds are soluble in the non-polar solvents. Non-limiting examples of such compounds are titanium halides, e.g., titanium tetrachloride, titanium alkoxides e.g., where the alkoxide moiety contains an alkyl radical of 1 to 6 carbon atoms or combinations, vanadium halides, and vanadium alkoxides. The preferred transition metal compounds are titanium compounds, preferably tetravalent titanium compounds. The most preferred titanium compound is titanium tetrachloride. Mixtures of such transition metal compounds may also be used and generally no restrictions are imposed on the transition metal compounds which may be included. Any transition metal compound that may be used alone may also be used in conjunction with other transition metal compounds.

The reaction of the transition metal compound, such as the tetravalent titanium compound, in the liquid medium conveniently takes place by slurrying the solid carrier containing the reactive magnesium species in a solution of the tetravalent titanium compound and heating the reaction medium to a suitable reaction temperature. Preferred solvents for the tetravalent titanium compound are hexane or isopentane or heptane.

The supported catalyst precursor formed from components described above is then activated with suitable activators. Suitable activators include organometallic compounds, preferably aluminum alkyl compounds, such as dialkylaluminum halide e.g. dialkylaluminum chlorides, dialkylaluminum hydrides, alkylaluminum halides, e.g. alkylaluminum chlorides, and trialkylaluminum compounds. In aluminum alkyl compounds, the alkyl group contains 1 to 6 carbon atoms and thus may be methyl, ethyl, propyl, butyl, isobutyl, pentyl and hexyl. Preferably, the activators are trialkylaluminum compounds, in which the alkyl group contains 1 to 6 carbon atoms and thus may be methyl, ethyl, propyl, butyl, isobutyl, pentyl and hexyl. More preferably, the activator is trimethylaluminum or triethylaluminum.

The catalyst precursor may be activated in situ by adding the activator and catalyst precursor separately to the polymerization medium. It is also possible to combine the catalyst precursor and activator before introduction into the polymerization medium, e.g., for up to about 2 hours at a temperature from about −40° to about 80° C.

A suitable activating amount of the activator may be used. The number of moles of activator per gram atom of titanium in the catalyst may be, e.g., from about 1 to about 500 and is preferably greater than about 5.

Alpha-olefins may be polymerized with the catalysts prepared according to aspects of the present invention by any suitable process. Such processes include polymerizations carried out in suspension, in solution or in the gas phase. Gas phase polymerizations are preferred such as those taking place in stirred bed reactors and, especially, fluidized bed reactors.

The molecular weight of the polymer may be controlled in a known manner, preferably by using hydrogen. With the catalysts produced according to the present invention, molecular weight may be suitably controlled with hydrogen when the polymerization is carried out at relatively low temperatures, e.g., from about 30° to about 105° C.

The catalysts prepared according to the present invention are particularly useful for the production of LLDPE resins. Such LLDPE resins may have a density of 0.94 g/cc or less, preferably 0.930 or less or even 0.925 g/cc or less. In accordance with certain aspects of the present invention, it is possible to achieve densities of less than 0.915 g/cc and even 0.900 g/cc.

Advantageous properties of LLDPE resins are described in the Anderson et al. U.S. Pat. No. 4,076,698. These LLDPE resins may be copolymers of ethylene with one or more $C_3$–$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. The relatively low MFR values of the copolymers prepared with the catalysts of this invention indicate that they are suitable for the preparation of various film products since such films are likely to have excellent strength properties. LLDPE resins produced in accordance with the present invention preferably contain at least about 80 percent by weight of ethylene units. Most preferably, the LLDPE resins of the invention contain at least 2 weight percent, for example from 2 to 20 weight percent of an alpha-olefin.

A particularly desirable method for producing LLDPE resins, according to the present invention, is in a fluid bed reactor. Such a reactor and means for operating same is described in the Levine et al U.S. Pat. No. 4,011,382 or the Karol et al U.S. Pat. No. 4,302,566, each of which is relied upon and incorporated by reference herein. The activity of the catalyst produced in accordance with the present invention is sufficient to produce an LLDPE resin such as an ethylene/1-hexene copolymer, e.g., having a density of less than 0.940 g/cc, in such a fluid bed reactor.

In order to achieve the desired density ranges in the copolymers it is necessary to copolymerize enough of the alpha-olefin comonomers with ethylene to achieve a level of 1 to 5 mol percent of the $C_3$ to $C_8$ comonomer in the copolymer. The amount of the comonomer needed to achieve this result will depend on the particular comonomer(s) employed.

In accordance with the invention, it has unexpectedly been found that using a gas phase catalytic polymerization reaction, 1-hexene can be incorporated into an ethylene-based copolymer chain with high efficiency. In other words, a relatively small concentration of 1-hexene monomer in the gas phase reactor can lead to a relatively large incorporation of 1-hexene into the copolymer. Thus, 1-hexene can be incorporated into an ethylene-based copolymer chain in a gas phase reactor in amounts up to 15 percent by weight, preferably 4 to 12 percent by weight, to produce an LLDPE resin having a density of less than 0.940 g/cc.

It is essential to operate the fluid bed reactor at a temperature below the sintering temperature of the polymer particles. For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94, and temperatures of about 90° to 115° C. are used to prepare products having a density of about 0.94 to 0.96.

The fluid bed reactor is operated at pressures of up to about 1000 psi, and is preferably operated at a pressure of from about 150 to 350 psi.

Films having especially desirable properties may be formed with the above-mentioned ethylene/1-hexene copolymers prepared with the catalysts of the present invention by a variety of techniques. For example, desirable blown films may be formed.

Blown films formed from ethylene/1-hexene copolymers having a density from 0.916 to 0.928 g/cc may have especially desirable properties for bag manufacture. For example, such blown films may be fabricated into trash bags. A particular example of a blown film formed from an ethylene/1-hexene copolymer having a density of 0.918 and an $I_2$ of 1 (ASTM D-1238, condition E), which is, in turn, formed in a gas phase, fluid bed reactor with a catalyst according to the present invention, is a blown film having improved dart impact strength, enhanced Elmendorf tear strength in the machine direction (MD) and higher tensile strength.

The following Examples illustrate reactants and parameters which may be used in accordance with aspects of the present invention.

EXAMPLES

CATALYST PRECURSOR PREPARATION

Example 1.

1-Butanol/$SiCl_4$ molar ratio=3 Into Schlenk flask A was placed Davison grade 955 silica (6.00 g), which was previously calcined at 600° C., and heptane (90 ml). Dibutylmagnesium (6.00 mmol) was added to this slurry at 50°–55° C. and the mixture was stirred at this temperature for 1 hr. Into Schlenk flask B at 55° C. was placed heptane (50 ml) and 1-butanol (11.88 mmol), followed by the addition of $SiCl_4$ (3.96 mmol). This reaction medium was stirred at 55° C. for 1 hour and then transferred to the slurry in flask A via cannula. The slurry in flask A was then stirred at 55° C. for 2 hours. Then, $TiCl_4$ (6.00 mmol) was added and the mixture was stirred for 1 hour at 55° C. Heptane was removed by evaporation under a strong nitrogen flow to yield 7.80 g of orange-brown free-flowing powder.

Example 2.

1-Butanol/$SiCl_4$ molar ratio=2 Same as Example 1 except 7.92 mmol of 1-butanol was used.

Example 3.

1-Butanol/$SiCl_4$ molar ratio=4 Same as Example 1 except 15.84 mmol of 1-butanol was used.

Example 4.

1-Octanol/$SiCl_4$ molar ratio=2 Same as Example 1 except 7.92 mmol of 1-octanol was used.

Example 5.

1-Octanol/$SiCl_4$ molar ratio=3 Same as Example 1 except 11.88 mmol of 1-octanol was used.

Example 6.

3-Octanol/$SiCl_4$ molar ratio=3 Same as Example 1 except 11.88 mmol of 3-octanol was used.

Comparative Example 1.

No alcohol was employed Same as Example 1 till after the addition of dibutylmagnesium. Then $SiCl_4$ (7.92 mmol) was added and the mixture was stirred at 55° C. for 1.5 h. Next, $TiCl_4$ (6.00 mmol) was added, the slurry was stirred for 1 hour, and then the heptane was removed by evaporation to yield 7.60 g of brown free-flowing powder.

POLYMERIZATION

Ethylene/1-hexene copolymers were prepared with these catalyst precursors and the cocatalyst trimethylaluminum (TMA) or triethylaluminum (TEAL). The procedure is described below.

A 1.6 liter stainless-steel autoclave equipped with a magnet stirrer was filled with heptane (750 ml) and 1-hexene (225 ml) under a slow nitrogen purge at 50° C. and then 3.0 mmol of cocatalyst was added. The reactor was closed, the stirring was increased to 1000 rpm, and the temperature was increased to 85° C. The internal pressure was raised 16 psi with hydrogen and then ethylene was introduced to maintain the total pressure at 110 psig. After that, the temperature was decreased to 80° C., 9.8 mg of catalyst precursor was introduced into the reactor with ethylene over-pressure, and the temperature was increased and held at 85° C. The polymerization reaction was carried out for 1 hour and then the ethylene supply was stopped. The reactor was allowed to cool to ambient temperature and the polyethylene was collected and dried in the air overnight. Given in Table 1 are the catalyst productivities, polymer flow indexes and MFR values, and mole% hexene in the polymer. The data show that using an alcohol in the preparation of the catalyst precursor (Examples 1–6) produces catalyst systems which are much more active than the catalyst system comprising a catalyst precursor in which no alcohol was used (Comparative Example 1). Also, resins produced with the alcohol-based catalyst systems have a much narrower molecular weight distribution as evident form their lower MFR values than those of resins produced with the alcohol-free catalyst system.

TABLE 1

| Catalyst Precursor | Alcohol | Alcohol mmol/g silica | Alcohol/SiCl$_4$ molar ratio | Cocatalyst | Productivity* | Flow Index | 1-Hexene mole % | MFR |
|---|---|---|---|---|---|---|---|---|
| Comparative Example 1 | None | 0.00 | 0 | TMA | 2440 | 20.8 | 2.2 | 42.0 |
| Example 2 | 1-butanol | 1.32 | 2 | TMA | 9410 | 21.8 | 2.8 | 27.8 |
| Example 1 | 1-butanol | 1.98 | 3 | TMA | 8330 | 16.4 | 2.2 | 25.9 |
| Example 3 | 1-butanol | 2.64 | 4 | TMA | 5180 | 26.8 | 2.7 | 26.0 |
| Example 4 | 1-octanol | 1.32 | 2 | TMA | 9500 | 32.6 | 2.7 | 26.9 |
| Example 5 | 1-octanol | 1.98 | 3 | TMA | 7450 | 21.1 | 2.4 | 26.2 |
| Example 6 | 3-octanol | 1.98 | 3 | TMA | 3650 | 37.8 | 1.9 | 34.5 |
| Comparative Example 1 | None | 0.00 | 0 | TEAL | 1225 | 24.7 | 1.7 | 41.9 |
| Example 1 | 1-butanol | 1.98 | 3 | TEAL | 4770 | 17.7 | 2.1 | 27.8 |
| Example 3 | 1-butanol | 2.64 | 4 | TEAL | 3570 | 22.3 | 2.2 | 27.4 |

**Productivity is given in units of gram polymer/gram catalyst-h-100 psi ethylene
TMA = trimethylaluminum
TEAL = triethylaluminum Thus it is apparent that there has been provided, in accordance with the invention, a catalyst, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit anal broad scope of the appended claims.

What is claimed is:

1. A catalyst composition for copolymerization of ethylene with an alpha-olefin, to produce a resin product of narrow molecular weight distribution, and having a density of less than 0.94 g/cc; wherein the catalyst composition is prepared by a process which comprises the steps of:

(i) contacting a solid, porous carrier having reactive OH groups in a non-polar liquid with dibutylmagnesium to form a product of step (i) which contains said carrier and incorporated therein a source of magnesium, wherein said dibutylmagnesium is soluble in said non-polar liquid; wherein, the ratio of the number of moles of said dibutylmagnesium to the number of moles of said OH groups is from about 1.1 to about 2.5;

(ii) introducing into the liquid containing said product of step (i) a mixture of SiCl$_4$ and an alcohol R"OH in which R" is selected from the group consisting of methyl, ethyl, propyl, n-butyl, pentyl, and n-octyl, thereby to form a slurry of step (ii) wherein the mixture has a molar ratio of R"OH to SiCl$_4$ of 2.00 to 6.00; wherein the molar ratio of SiCl$_4$ to Mg is 0.40 to 1.40; and wherein the molar ratio of R"OH to Mg is at least about 1.32.

(iii) contacting said slurry of step (ii) with at least one transition metal compound in a non-polar liquid medium, the number of moles of said transition metal compound being in excess of the number of moles of OH groups on said carrier prior to reaction with said dibutylmagnesium in step (i), said transition metal compound being soluble in said non-polar liquid, and said dibutylmagnesium contacted carrier being substantially insoluble in said liquid medium, whereby a reacted form of the transition metal becomes supported on said carrier to form a step (iii) precursor; and (iv) contacting the step (iii) precursor with an activating amount of trialkylaluminum R'$_3$Al, in which R' is an alkyl group of 1 to 10 carbon atoms.

2. The catalyst composition of claim 1, wherein the carrier is silica.

3. The catalyst of claim 2, wherein the trialkylaluminum is trimethylaluminum.

4. A catalyst composition of claim 2, wherein the trialkylaluminum is triethylaluminum.

5. The catalyst of claim 4, wherein the molar ratio of the triethylaluminum to transition metal ranges from 1 to 500.

6. The catalyst of claim 5, wherein the transition metal is titanium.

7. The catalyst of claim 6, wherein the transition metal is provided as tetravalent titanium compound.

8. The catalyst of claim 7, wherein the tetravalant titanium compound is titanium tetrachloride.

9. A catalyst which is formed by the steps consisting essentially of (i)–(iv) of claim 1.

10. A catalyst which is formed by the steps consisting of (i)–(iv) of claim 1.

11. A catalyst which is formed by the steps consisting essentially of (i)–(iv) of claim 8.

12. A catalyst composition for copolymerization of ethylene with an alpha-olefin, to produce a resin product of narrow molecular weight distribution, wherein the catalyst is prepared by a process which comprises the steps of:

contacting a solid, porous carrier having reactive OH groups in a non-polar liquid with an organomagnesium compound which has the empirical formula $$R_m MgR'_n$$

where R and R' are the same or different $C_4$–$C_8$ alkyl groups, and m and n are each 0, 1 or 2, providing that m+n=2, to form a product of step (i) which contains said carrier and incorporated therein a source of magnesium, wherein said organomagnesium compound is soluble in said non-polar liquid; wherein, the ratio of the number of moles of said organomagnesium compound to the number of moles said OH groups is from about 1.1 to about 2.5

(ii) introducing into the liquid containing said product of step (i) a mixture of R"OH wherein R" is selected from the group consisting of methyl, ethyl, propyl, n-butyl, pentyl, and n-octyl, and $SiCl_4$ to form a slurry of step (ii)

wherein the mixture is characterized by a molar ratio of R"OH to $SiCl_4$ ranging from 2.00 to 6.00; wherein the molar ratio of $SiCl_4$ to Mg is 0.40 to 1.40; and wherein the molar ratio of R"OH to Mg is at least about 1.32

(iii) contacting said slurry of step (ii) with at least one transition metal compound in a non-polar liquid medium, the number of moles of said transition metal compound being in excess of the number of moles of OH groups on said carrier prior to reaction with said organomagnesium compound in step (i), said transition metal compound being soluble in said non-polar liquid, and said organomagnesium compound contacted carrier being substantially insoluble in said liquid medium, whereby a reacted form of the transition metal becomes supported on said carrier to form a step (iii) precursor; and (iv) contacting the step (iii) precursor with an activating amount of trialkylaluminum.

13. The catalyst composition of claim 12, wherein the carrier is silica.

14. The catalyst of claim 13, wherein the trialkylaluminum is trimethylaluminum.

15. A catalyst composition of claim 13, wherein the trialkylaluminum is triethylaluminum.

16. The catalyst of claim 15, wherein the molar ratio of the triethylaluminum to transition metal ranges from 1 to 500.

17. The catalyst of claim 16, wherein the transition metal is titanium.

18. The catalyst of claim 17, wherein the transition metal is provided as tetravalent titanium compound.

19. The catalyst of claim 18, wherein the tetravalent titanium compound is titanium tetrachloride.

20. A catalyst which is formed by the steps consisting essentially of (i)–(iv) of claim 12.

21. A catalyst which is formed by the steps consisting of (i)–(iv) of claim 12.

22. A catalyst which is formed by the steps consisting essentially of (i)–(iv) of claim 18.

23. A catalyst which is formed by the steps consisting essentially of (i)–(iv) of claim 19.

24. The catalyst of claim 13, wherein the molar ratio of R"OH to $SiCl_4$ is 3 to 4.

25. The catalyst of claim 1, wherein R"OH is n-butanol or n-octanol.

26. The catalyst of claim 1, wherein R"OH is n-butanol.

27. The catalyst of claim 12, wherein R"OH is n-butanol or n-octanol.

28. The catalyst of claim 12, wherein R"OH is n-butanol.

29. The catalyst of claim 12, wherein the molar ratio of R"OH to $SiCl_4$ is 3 to 4.

30. The catalyst of claim 6, wherein the R"OH is n-butanol or n-octanol.

31. The catalyst of claim 3, wherein the transition metal is titanium.

32. The catalyst of claim 31, wherein the R"OH is n-butanol or n-octanol.

33. The catalyst of claim 32, wherein the R"OH is n-butanol.

34. The catalyst of claim 14, wherein the transition metal is titanium.

35. The catalyst of claim 3, wherein the R"OH is n-butanol or n-octanol.

36. The catalyst of claim 35, wherein the R"OH is n-butanol.

37. The catalyst of claim 17, wherein the R"OH is n-butanol or n-octanol.

38. The catalyst of claim 37, wherein the R"OH is n-butanol.

* * * * *